UNITED STATES PATENT OFFICE.

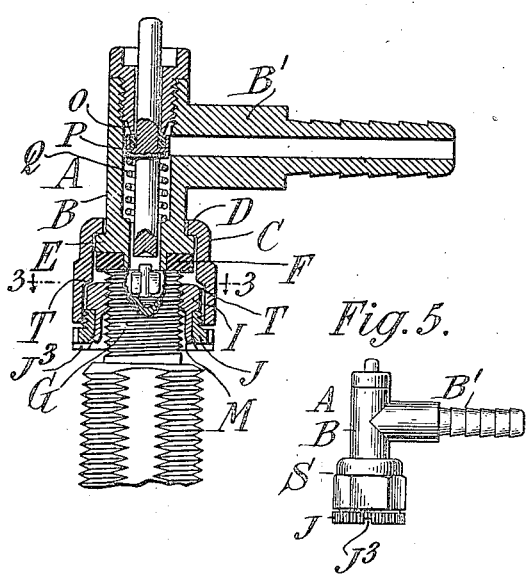
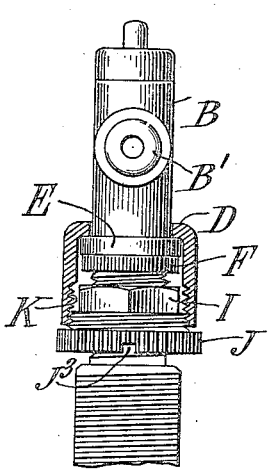
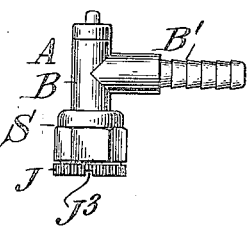
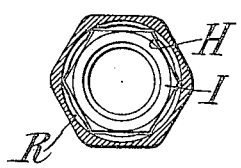
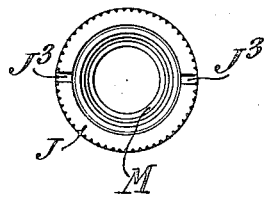
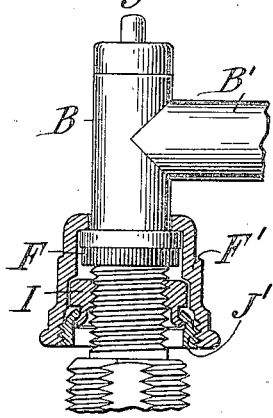
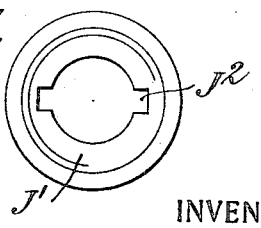

HENRY P. KRAFT, OF RIDGEWOOD, NEW JERSEY.

PUMP-COUPLING OR THE LIKE.

1,384,196.  Specification of Letters Patent.  Patented July 12, 1921.

Application filed June 26, 1917. Serial No. 177,005.

*To all whom it may concern:*

Be it known that I, HENRY P. KRAFT, a citizen of the United States of America, residing in Ridgewood, in the county of Bergen and State of New Jersey, have invented certain new and useful Improvements in Pump-Couplings or the like, of which the following is a specification.

This invention relates to pump couplings or the like, and aims to provide certain improvements therein. Such couplings are usually provided with a swiveled member at the bottom which is screw-threaded on its interior and which is adapted to engage the nipple of a tire valve to attach the coupling thereto. The screwing down of the swiveled member carries with it the body of the coupling and compresses the packing of the latter against the end of the valve nipple. Such packings are necessarily of greater diameter than the screw-threaded aperture through the swivel and cannot be successfully removed through such aperture. As the swivel is permanently attached, there has been practically no way of renewing the packing when the latter wears out.

According to the present invention I provide means for permitting the renewal of the packing so that the length of life of the body of the coupling is greatly increased.

The invention also includes certain other features of construction which will be hereinafter more fully described.

In the drawings, wherein I have shown one form of the invention,—

Figure 1 is an elevation of the end of a valve shell or casing, having applied thereto a coupling constructed according to the invention, the coupling being shown in diametrical section.

Fig. 2 is a view taken at right angles to Fig. 1, showing the main parts of the coupling in elevation with the swiveled sleeve in section.

Fig. 3 is a cross-section taken on the line 3—3 in Fig. 1.

Fig. 4 is an under side view of the foot of the coupling.

Fig. 5 is an elevation of the coupling complete.

Fig. 6 is a view of a somewhat modified form.

Fig. 7 is an under side view of Fig. 6.

Referring to the drawings, let A indicate the coupling as a whole which is usually made with a portion B which is adapted to be screwed on a tire valve by the swiveled sleeve C. The inner end D of the latter is usually spun over a shoulder E on the body B. The body B carries the usual packing F which is pressed down against the top of the tire valve nipple G when the swiveled sleeve is screwed on the latter. In many couplings the body is provided with a right-angled branch B' adapted to be connected with the pump tube. The body B and branch B' are formed with appropriate bores through which air is led to the valve.

According to prior practice it has been customary to screw-thread the swiveled sleeve C on its interior so that it directly engages the valve nipple G. The screw-threaded bore thus formed in the sleeve is, of course, of less diameter than the packing F and this has made it very difficult to remove the packing and replace it in case it is worn.

According to the present invention I make the coupling C in two or more parts, one of which is removable to permit the insertion and withdrawal of the packing F. This may be accomplished in various ways, but I prefer that illustrated in the drawing, wherein the swivel member C is formed on its interior with a recess which is adapted to receive a nut 1. Provision is made for preventing relative rotation of the nut and swivel such as by forming the swivel with a hexagonal face and by similarly forming the nut. Any other suitable device for the purpose will suffice, particularly where the nut and its recess are made non-circular. Preferably also the means for holding the nut in its recess comprises an easily operable part, such as a screw-threaded sleeve J which engages a screw-thread K on the lower part of the swivel. Preferably in order that the nut and sleeve may not be so easily lost, they are swiveled together in some suitable manner as by forming a flange M on the nut which passes through the sleeve and is riveted over the under side thereof.

It will be seen by this construction that in the act of screwing or unscrewing the coupling no rotative strain is placed upon the sleeve J. The result is that there is no tendency to screw or unscrew the sleeve when the coupling is in use. If it is desired, however, to renew the packing the swivel C is held bodily in one hand or with a tool and the sleeve J is unscrewed carrying with it the nut I which slides out without rotation. The packing F is then easily accessible for inspection or replacement.

In ordinary pump couplings the part B will be closed at its top. The invention is, however, equally applicable to other forms of coupling, such, for instance, as that set forth in the application of M. C. Schweinert, filed October 26, 1915, Serial No. 57,943, which is also shown herein. In this construction a valve seat O is provided at the top of the coupling which is normally closed by a valve P under the pressure of a spring Q and under the air pressure which flows in through the branch B'. When it is desired to read the pressure in the tire, a gage is pressed down on top of the coupling, thus depressing the valve P which in turn depresses the pin of the tire valve.

The present invention provides an improvement in the construction of the above-entitled application in that the valve P is introduced through the top of the coupling instead of through the bottom, as in said application. The valve seat O is made separately from the coupling and is united thereto preferably by being screwed in with a leak-tight fit. This avoids the use of a separable part at the foot of the member B and permits the packing P to be placed upon an integral portion of the member B instead of on a threaded sleeve, as is the case in said application.

In Figs. 6 and 7 I have shown a construction which is similar to Fig. 1 except that the sleeve J' instead of extending to the outside of the swivel F is wholly inclosed within the latter, notches, such as $J^2$, being provided for the purpose of receiving a tool to unscrew the sleeve J'. For convenience these notches are made so that they can receive a coin of small denomination to act as a screw-driver. The same construction is shown at $J^3$ in Figs. 1 and 4.

In either of the constructions shown the swivel is best provided with an external grasping face adapted to render it easy to manipulate by hand. In the construction shown in Fig. 3 such grasping face is hexagonal which fits it for turning by hand or by wrench. Preferably the swivel is made from sheet metal drawn to shape, and its screw-thread R is formed directly in the hexagonal walls, and most of the thread is hence cut in the flats of the swivel. This construction is not claimed broadly herein, being the subject of other applications filed by me.

Preferably the swivel has a reduced portion S above the flats which results in a series of shoulders T (Fig. 1), being formed to limit the inward movement of the nut. These shoulders correspond to the angles of the nut, and are engaged by the latter.

While I have shown and described one form of the invention, it will be understood that I do not wish to be limited thereto, since various changes may be made therein without departing from the spirit of the invention.

What I claim is:—

1. A coupling or the like having a body portion with a passage therein, the body portion being provided with a coupling end adapted to receive a member such as the end of a tire valve, a detachable nut non-rotatively connected within said coupling end, and means movable independently of said coupling end and acting to retain the nut in fixed relation therewith.

2. A coupling or the like having a body portion with a passage therein, the body portion having a coupling end adapted to receive a member such as the end of a tire valve, a detachable nut non-rotatively connected within said coupling end, and separate means connecting the nut to the coupling end in fixed relation therewith and permitting communication through said means to the coupling end.

3. A coupling or the like having a swivel and a detachable non-collapsible nut non-rotatably arranged within the swivel and removable therefrom.

4. A coupling or the like having a swivel and a detachable non-collapsible nut non-rotatably connected to the swivel, and a separate means for connecting the nut to the swivel.

5. A coupling or the like having a body portion with a passage therein, the body portion having a coupling end to receive a member such as the end of a tire valve, a detachable non-collapsible nut non-rotatively associated with the coupling end of the body portion, and a screwthreaded member connecting the nut with the coupling.

6. A coupling or the like having a detachable, non-rotative nut and a screwthreaded member for connecting the nut to the coupling, said screwthreaded member being swiveled to the nut.

7. A coupling or the like having a swivel member, a non-collapsible detachable nut arranged within the swivel and removable therefrom, and a screwthreaded member adapted to secure said nut to said swivel.

8. A coupling or the like having a swivel member, a detachable nut, and a screwthreaded member adapted to secure said nut to said swivel, and said screwthreaded member being swiveled to said nut.

9. A coupling or the like having a body portion with a passage therein, the body portion having a part adapted to receive a screwthreaded member such as the end of a tire valve, and a non-collapsible nut non-rotatively secured within said part and removable therefrom.

10. A coupling or the like having a part adapted to receive a screwthreaded member such as the end of a tire valve, and a nut within said part and removable therefrom, said part and nut having polygonal faces to prevent rotation of the nut relatively to said part.

11. A coupling or the like having a part adapted to receive a screwthreaded member such as the end of a tire valve, and a nut within said part and detachably connected thereto, said part and nut having polygonal faces to prevent rotation of the nut relatively to said part, and a screw-threaded sleeve for connecting said nut to said part.

12. A coupling or the like having a part adapted to receive a screwthreaded member such as the end of a tire valve, and a nut within said part and detachably connected thereto, said part and nut having polygonal faces to prevent rotation of the nut relatively to said part, and a screw-threaded sleeve for connecting said nut to said part, said nut and sleeve being swiveled.

13. A coupling having an attaching member formed of sheet metal and having a polygonal cross-section affording flat interior surfaces, the interior of said member being screwthreaded chiefly on the flat interior surfaces.

14. The combination with a support and a coupling member arranged thereon, of a nut which is threaded at its innermost portion to receive a tire valve or the like, said nut being removable from the coupling member, and means for holding the nut in non-rotative engagement with the coupling member.

15. The combination with a support and a coupling member having swiveled engagement therewith, of a nut which is threaded at its innermost portion to receive a tire valve or the like, said nut being removable from the coupling member, and means for holding the nut in non-rotative engagement with the coupling member.

16. A coupling or the like having a swivel and a detachable nut non-rotatably mounted within the swivel and removable therefrom.

17. A coupling or the like having a swivel and a detachable nut non-rotatably mounted within the swivel, and a separate means for connecting the nut to the swivel.

18. An connection comprising separable sections, one of which has an exteriorly threaded end, a nut member connected to the other pipe section, and a sectional nut engaged with the threads of the first section and with the nut member for connecting the separable sections, the sections of the nut being swivel-connected.

In witness whereof, I have hereunto signed my name.

HENRY P. KRAFT.